(12) United States Patent
Lee

(10) Patent No.: US 8,324,878 B2
(45) Date of Patent: Dec. 4, 2012

(54) VOLTAGE REGULATOR WITH GATE RESISTOR FOR IMPROVED EFFICIENCY

(75) Inventor: Dong Ho Lee, Vancouver, WA (US)

(73) Assignee: NXP B.V., Eindhoven (NL)

( * ) Notice: Subject to any disclaimer, the term of this patent is extended or adjusted under 35 U.S.C. 154(b) by 657 days.

(21) Appl. No.: 12/610,959

(22) Filed: Nov. 2, 2009

(65) Prior Publication Data

US 2011/0101952 A1 May 5, 2011

(51) Int. Cl.
*G05F 1/40* (2006.01)
(52) U.S. Cl. ........................................ 323/282; 323/351
(58) Field of Classification Search .................. 323/222, 323/225, 282–284, 351
See application file for complete search history.

(56) References Cited

U.S. PATENT DOCUMENTS

| | | | | |
|---|---|---|---|---|
| 6,229,288 | B1* | 5/2001 | Baretich et al. | 323/223 |
| 7,508,175 | B2* | 3/2009 | DeWitt et al. | 323/224 |
| 7,782,025 | B2* | 8/2010 | Hashimoto et al. | 323/224 |
| 2011/0260705 | A1* | 10/2011 | Saeki et al. | 323/299 |

OTHER PUBLICATIONS

INTERSIL, High Voltage Synchronous Rectified Buck MOSFET Driver, Data Sheet, Dec. 2, 2005, p. 1-10.

* cited by examiner

*Primary Examiner* — Jessica Han

(57) ABSTRACT

A voltage regulator includes an active control switch, an active sync switch, a driver circuit, and a gate resistor. The active control switch is coupled between an input voltage line and an input of an energy storage device. The active sync switch is coupled to the input of the energy storage device. The driver circuit is coupled to the control and sync switches to alternately drive each of the control and sync switches into a conducting state to produce a regulated voltage at an output of the energy storage device. The gate resistor is coupled in series within a control path of the sync switch. The gate resistor has a resistance value that is tuned to reduce an anticipated dead time between a turn-off time of the sync switch and a turn-on time of the control switch.

20 Claims, 4 Drawing Sheets

VOLTAGE REGULATOR WITH GATE RESISTOR FOR IMPROVED EFFICIENCY

BACKGROUND

Voltage regulators are used in electronic equipment to supply a regulated voltage to a load. A switching-mode voltage regulator uses a pair of switches (e.g., control and sync MOSFET switches) to regulate the voltage output from the regulator. The switches are alternately turned on and off, and the regulated voltage is output from an energy storage device such as an inductor that is coupled between the switches.

Conventional switching-mode voltage regulators experience voltage spikes when the control MOSFET is turned on because the reverse recovery current of the body diode of the sync MOSFET allows excess current to flow when the sync MOSFET is turned off. Conventional approaches to deal with the voltage spikes include the use of a Schottky or fast recovery diode implemented on the body diode of the sync MOSFET to reduce reverse recovery current, the use of an R-C snubber, and the implementation of soft recovery on the body diode. However, these conventional approaches are relatively expensive and/or ineffective.

SUMMARY

A more efficient voltage regulator incorporates a tuned gate resistance into a control path of the sync switch. The tuned gate resistance may reduce an anticipated dead time between a turn-off time of the sync switch and a turn-on time of the control switch. Also, the tuned gate resistance may reduce anticipated voltage spikes during a turn-on time of the control switch. By using the tuned gate resistance to reduce the dead time and/or reduce the anticipated voltage spikes, the voltage regulator may be less expensive to manufacture and may use less power to operate.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
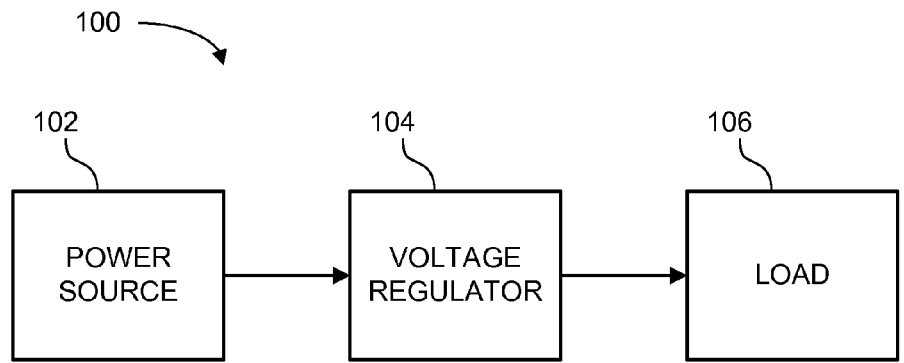
FIG. 1 depicts a schematic block diagram of one embodiment of a voltage conversion system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments implement a series gate resistor for a synchronous (sync) MOSFET switch for active suppression ("snubbering") of voltage spikes and improved efficiency in a voltage regulator. In particular, certain embodiments reduce voltage spikes by allowing the sync MOSFET switch to conduct current during the occurrence of a voltage spike. More specifically, embodiments of the series gate resistor allow the sync MOSFET switch to turn on and absorb, or burn out, extra energy stored as parasitic inductance within the switching circuit.

In some embodiments, a user such as a circuit designer can adjust the amount of conduction by selecting an appropriate resistor value. By using a series gate resistor, for example, at the gate of the sync MOSFET of a DC-DC voltage regulator, voltage spikes during the turn-on of the control MOSFET can be reduced significantly. The reduction in the voltage spikes also allows a designer to use lower voltage rated switching devices, which further improves the efficiency and/or cost of the system.

In addition to suppressing voltage spikes, the gate resistor also delays turning off the signal of the sync MOSFET switch, which extends the conduction time of the sync MOSFET switch and, hence, effectively reduces the dead time (the time after the sync MOSFET turns off until the control MOSFET turns on) of the circuit by at least a small amount. This effective reduction of dead time reduces electrical losses that would otherwise occur during the dead time. Hence, the resistance value of the gate resistor can be tuned to significantly improve the efficiency of the voltage regulator by reducing the dead time during which current flows through the body diode of the sync MOSFET switch, which generates more loss due to the diode forward voltage drop. In other words, the amount of turn on time and current conduction can be adjusted, and improved or optimum operating conditions may be achieved, by selecting an appropriate value of the series gate resistor.

The tuned series resistance can be located anywhere in the gate control path. For example, the tuned series resistance can be implemented in a discrete resistor that is located anywhere between the output of the gate driver circuit and the gate node of the sync MOSFET switch. As other examples, the gate resistance may be implemented inside of either the sync MOSFET switch (e.g., as increased internal gate resistance) or the gate driver IC (e.g., as increased output impedance).

Further, the embodiments described herein may be used to realize one or more advantages. For example, some embodiments facilitate a reduction of typical voltage spikes using conventional switches. Some embodiments reduce power losses by reducing the dead time. Some embodiments allow a user to select calculated and/or optimized values of the series gate resistor for a particular need or objective. Some embodiments allow a user to use lower voltage rated switching devices, which will improve efficiency and/or cost of the system even further. Other embodiments may exhibit or result in further advantages over conventional voltage regulators.

FIG. 1 depicts a schematic block diagram of one embodiment of a voltage regulation system 100. The illustrated voltage regulation system 100 includes a power source 102, a voltage regulator 104, and a load 106. Although the voltage regulation system 100 is shown and described with certain components and functionality, other embodiments of the voltage regulation system 100 may include fewer or more components to implement less or more functionality.

Embodiments of the voltage regulation system 100 may be implemented in various types of electronic devices and systems. For example, many microprocessors use voltage regulators to provide a regulated direct current (DC) voltage from an alternating current (AC) voltage supply. Other embodiments use a DC supply voltage and/or produce a regulated AC voltage. Voltage regulators are also used for the processor core voltage on conventional computer motherboards and computer processors. Additionally, many types of mobile devices use voltage regulators to control the voltage supply from a battery source to the internal circuitry.

In general, the power source 102 supplies a known voltage to the voltage regulator 104. The voltage regulator 104 may include functionality to convert the supplied voltage to a different voltage level. The voltage regulator 104 outputs a regulated voltage to the load 106, which operates using the regulated voltage.

Figure 2:
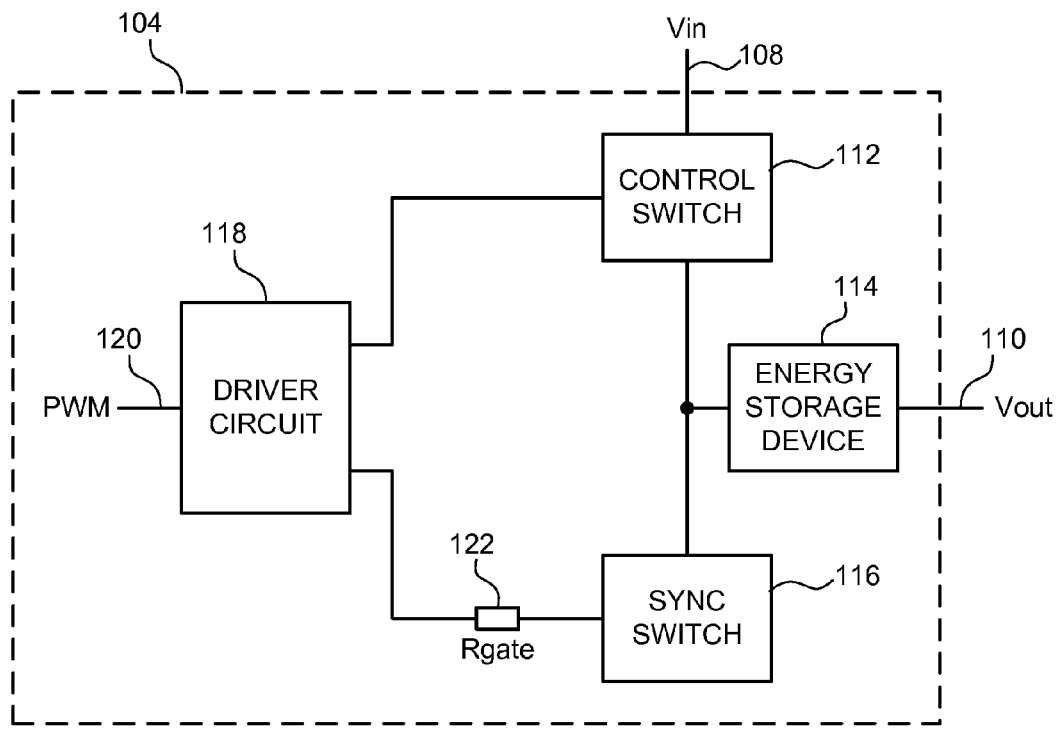
FIG. 2 depicts a schematic block diagram of the voltage regulator of the voltage regulation system of FIG. 1.

FIG. 2 depicts a schematic block diagram of the voltage regulator 104 of the voltage regulation system 100 of FIG. 1. In general, the voltage regulator 104 receives the supply voltage, Vin, at an input line 108 and produces the regulated voltage, Vout, at an output line 110. Specifically, FIG. 2 depicts one embodiment of a voltage regulator 104 that may be implemented in a switching-mode power supply (or converter).

The illustrated voltage regulator 104 includes a control switch 112, an energy storage device 114, and a sync switch 116. The voltage regulator 104 also includes a driver circuit 118 which receives a pulse-width-modulated input signal, PWM, on an input line 120. In general, the driver circuit 118 controls the operations of the control switch 112 and the sync switch 116 to generate a substantially constant regulated voltage at the output line 110. More specifically, the driver circuit 118 sends drive signals to alternately turn on the control and sync switches 112 and 116, which drive the switches 112 and 116 into a conducting state. The amount of time that each switch 112 and 116 is turned on (while the other is turned off) depends on the PWM input signal. The value or characteristics of the PWM input signal may depend, at least in part, on the monitored value of the regulated voltage signal, Vout. In this implementation, the control switch 112 acts as a switch to regulate the voltage, and the sync switch 116 acts as a synchronous rectifier.

For reference, the control of the control and sync switches 112 and 116 impacts the efficiency of the voltage regulator 104. If the switches 112 and 116 are allowed to conduct simultaneously, then a direct current path from the input line 108 to a ground reference (not shown) through both the control and sync switches 116 is formed, which allows a "shoot-through" current to flow. Conversely, the time during which both of the control and sync switches 112 and 116 are simultaneously not conducting is referred to as the "dead time." Given the variety of manufacturing parameters that may influence when each switch 112 and 116 is conducting, the driver circuit 118 is typically programmed or designed to implement a conservative dead time that is long enough to accommodate several types of switches 112 and 116, so that the switches 112 and 116 are not inadvertently allowed to conduct simultaneously. As explained above, a dead time value that is overly conservative for a given design can be inefficient.

Figure 3:
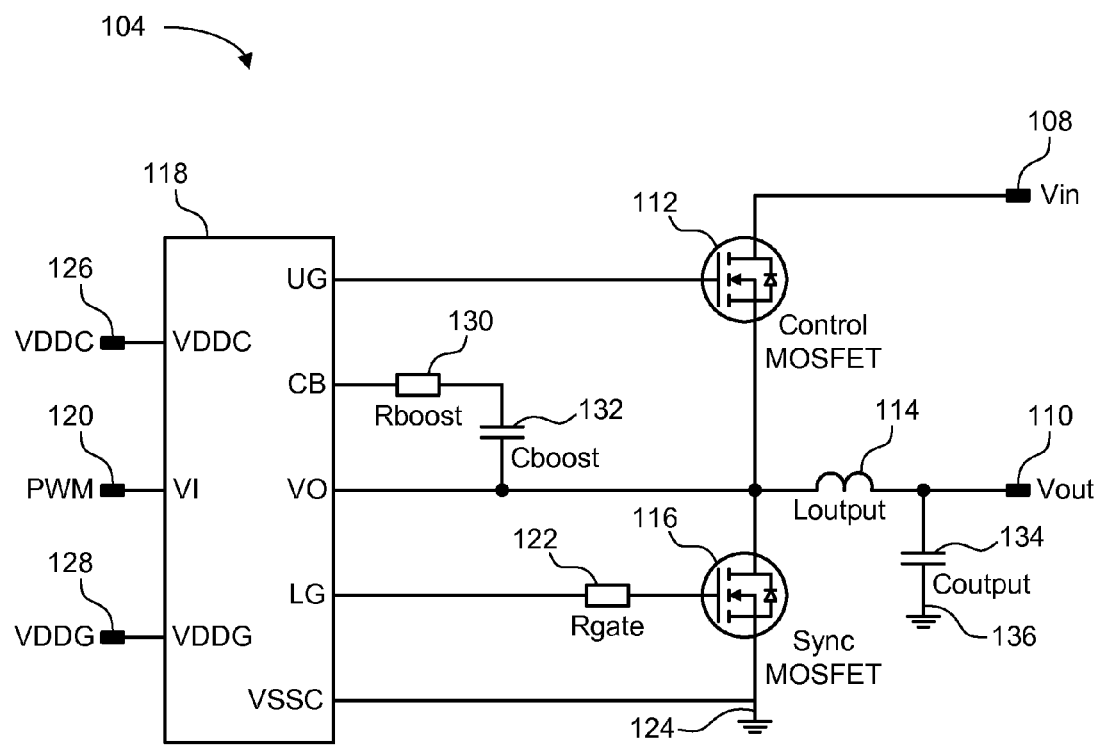
FIG. 3 depicts a more detailed schematic diagram of one embodiment of the voltage regulator of FIG. 2.
Figure 4:
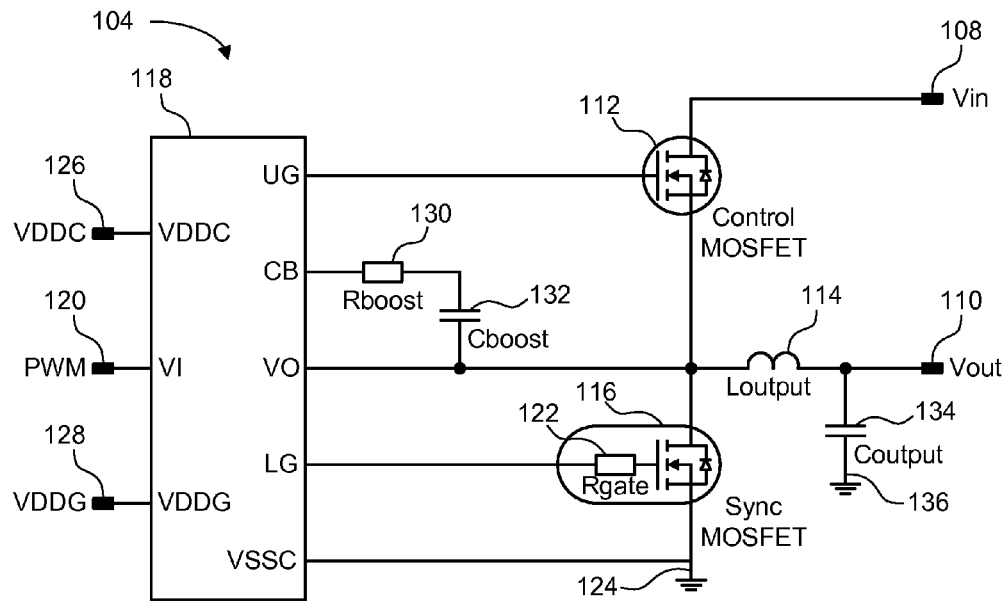
FIG. 4 depicts a more detailed schematic diagram of another embodiment of the voltage regulator of FIG. 2 with the gate resistor integrated as part of the sync MOSFET switch.
Figure 5:
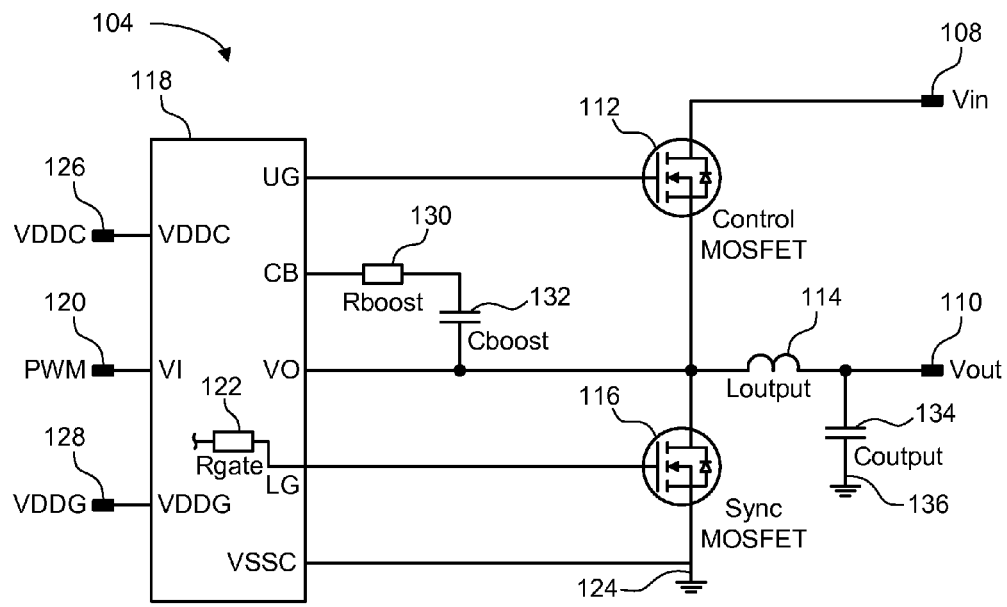
FIG. 5 depicts a more detailed schematic diagram of another embodiment of the voltage regulator of FIG. 2 with the gate resistor integrated as part of the gate driver IC.

The illustrated voltage regulator 104 also includes a gate resistor 122, Rgate, which is located between the driver circuit 118 and the sync switch 116. Several possible implementations of the gate resistors 122 are shown in FIGS. 3-5 and described below. Other embodiments may use other implementations of one or more gate resistors 122 positioned at one or more locations to achieve similar results.

In one embodiment, the value of the gate resistor 122 is selected to tune the performance of the voltage regulator 104. Specifically, the value of the gate resistor 122 may be tuned to address inefficiencies related to the dead time implemented by the driver circuit 118. For example, the gate resistor 122 may be tuned with a resistance value which extends the conduction time of the sync switch 116 and, hence, effectively reduces the dead time imposed by the driver circuit 118. This effective reduction of dead time reduces electrical losses that would otherwise occur during the dead time.

In one embodiment, the control and sync switches 112 and 116 are implemented as MOSFET devices (refer to FIGS. 3-5 described below). When the inductor 114 current flows through the sync MOSFET 116, the voltage drop across the sync MOSFET 116 is proportional to the channel resistance of the sync MOSFET 116. By using sync MOSFET 116 with very low channel resistance, the voltage drop across the sync MOSFET 116 is very low, resulting in lower or minimized losses. However, during the dead time in which the sync MOSFET 116 is turned off and the inductor 114 current flows through the body diode of the sync MOSFET 116, the voltage drop across the sync MOSFET 116 is the same as the diode voltage drop, which is significantly bigger than the voltage drop across the channel resistance. For example, using a MOSFET with one-milliohm channel resistance results in a 0.01V drop across the sync MOSFET 116 at 10A of inductor 114 current during the sync MOSFET 116 conduction time, while resulting in about 1V during the dead time. So the losses during the dead time can be, in this example, approximately 100 time more than during the conduction time of the sync MOSFET 116. By simply reducing the length of the dead time, this loss is reduced and the efficiency is improved.

As a matter of convenience, the dead time typically imposed by the driver circuit 118, in the absence of the gate resistor 122, is referred to herein as the default, anticipated, or expected dead time. In contrast, the calculated or actual dead time that results from the combination of the driver circuit 118 and the gate resistor 122 is referred to herein as the actual or effective dead time. Thus, including the gate resistor 122 in the control path of the sync switch 116 reduces the default dead time of the driver circuit 118 to a shorter effective dead time. Consequently, the efficiency of the voltage regulator 104 improves because the effective dead time is less than the default dead time.

Also, the value of the gate resistor 122 may be tuned to address the voltage spikes that occur during switching transitions. At the end of the dead time, the control MOSFET 112 is turned on by the drive circuit 118, which provides a current path from the input line 108 through the control MOSFET 112 to the inductor 114. The disrupted current of the inductor 114 at the sync MOSFET 116 generates a voltage spike across the drain of the sync MOSFET 116. Usually, this voltage spike is induced to the gate of sync MOSFET 116, but the induced voltage is very small due to the low impedance of the sync MOSFET drive line (e.g., drive line LG shown in FIG. 3) of the gate drive circuit 118. By providing appropriate impedance in the sync MOSFET gate drive path, the induced voltage at the gate of the sync MOSFET 116 allows the sync MOSFET 116 to turn on appropriately allowing current to flow through the impedance, which absorbs stray energy and, hence, effectively reduces the voltage spike. In particular, the gate resistor 122 allows the sync switch 116 to turn on and absorb, or burn out, extra energy stored as parasitic inductance within the voltage regulator 104. Thus, the gate resistor 122 actively suppresses ("snubs") the voltage spikes that would otherwise decrease the reliability of the voltage regulator 104.

FIG. 3 depicts a more detailed schematic diagram of one embodiment of the voltage regulator 104 of FIG. 2. Although the voltage regulator 104 of FIG. 3 is shown and described with certain components and functionality, other embodiments of the voltage regulator 104 may include fewer or more components to implement less or more functionality.

In the illustrated embodiment, the control and sync switches 112 and 116 are implemented as MOSFET devices (control and sync MOSFET switches), the energy storage device 114 is implemented as an inductor (Loutput), and the driver circuit 118 is implemented as a gate driver IC 118. The input line 108 is connected to the drain node of the control MOSFET switch 112, and the output line 110 is connected to the output of the inductor 114. Also, the source node of the sync MOSFET switch 116 is connected to a ground reference 124.

The gate driver IC 118 includes two or three input lines and four output lines. The input lines include the input (VI) line 120 which receives the PWM input signal. The input lines also include a voltage source (VDDC) supply line 126 and, in some embodiments, a gate voltage source (VDDG) supply line 128. The output lines include an upper gate (UG) control line, a lower gate (LG) control line, and a reference voltage (VSSC) line, which can be shared as a reference line for the input lines. In some embodiments, the output lines also include other lines (CB and VO) related to conventional charge pump functions of the gate driver IC 118. These output lines (CB and VO) may be connected in a conventional manner via a boost resistor (Rboost) 130 and a boost capacitor (Cboost) 132 to the input of the inductor 114. Additionally, a filter capacitor (Coutput) 134 may be connected between the output of the inductor 114 and a ground reference 136 to filter the DC waveform presented at the output line 110.

In the illustrated embodiment, the gate resistor (Rgate) 122 is shown as a discrete circuit element connected in the control path of the sync MOSFET switch 116. Specifically, the gate resistor 122 is connected between the LG output of the gate driver IC 118 and the gate node terminal of the sync MOSFET switch 116. In some embodiments, it may be advantageous to use a discrete circuit element that is separate from both the gate driver IC 118 and the sync MOSFET switch 116 to implement the gate resistor 122 so that a circuit designer can customize or tune the value of the gate resistor 122 independently of the other circuit components. In this way, the circuit designer may tune the resistance value of the gate resistor 122 to increase the efficiency of the voltage regulator 104 by reducing the dead time and/or reducing the voltage spikes, as described above, without requiring customization of the other circuit components.

FIG. 4 depicts a more detailed schematic diagram of another embodiment of the voltage regulator 104 of FIG. 2. While the embodiment shown in FIG. 4 is substantially similar to the embodiment shown in FIG. 3 and described above, the embodiment of FIG. 4 shows the gate resistor 122 integrated as part of the sync MOSFET switch 116. In one embodiment, the gate resistor 122 may be a separate, but integrated, circuit component within the package for the sync MOSFET switch 116. In another embodiment, the gate resistor 122 may be an increased internal gate resistance of the sync MOSFET switch 116. In either case, the effective gate resistance is located in series with the control path between the gate driver IC 118 and the sync MOSFET switch 116. By incorporating the gate resistor 122 within the sync MOSFET switch 116, some embodiments of the circuit design may be simplified because the integrated gate resistance reduces or eliminates the need for a customer of the sync MOSFET switch 116 to change the design of the board in order to get a benefit from the gate resistor 122.

FIG. 5 depicts a more detailed schematic diagram of another embodiment of the voltage regulator of FIG. 2. While the embodiment shown in FIG. 5 is substantially similar to the embodiment shown in FIG. 3 and described above, the embodiment of FIG. 5 shows the gate resistor 122 integrated as part of the gate driver IC 118. In one embodiment, the gate resistor 122 may be a separate, but integrated, circuit component within the package for the gate driver IC 118. In another embodiment, the gate resistor 122 may be an increased output impedance of the LG output line of the gate driver IC 118. The value of the increased output impedance of the LG output line may be fixed or variable. In some embodiments, the gate driver IC 118 dynamically changes the value of the impedance of the LG output line according to the mode of operation, so that the output impedance is adapted to or optimized for each operating mode. For example, if there is a preferred or optimum value of the gate resistance for reducing the dead time and a different preferred or optimum value of the gate resistance for reducing the voltage spikes, then the gate drive IC 118 can change the impedance to the optimum value for each mode of the operation. Regardless of the location of the gate resistor 122, the effective gate resistance is located in series with the control path between the gate driver IC 118 and the sync MOSFET switch 116. By incorporating the gate resistor 122 within the gate driver IC 118, some embodiments of the circuit design may be simplified because the integrated gate resistance reduces or eliminates the need for a customer of the gate driver IC 118 to change the design of the board in order to get a benefit from the gate resistor 122.

Figure 6:
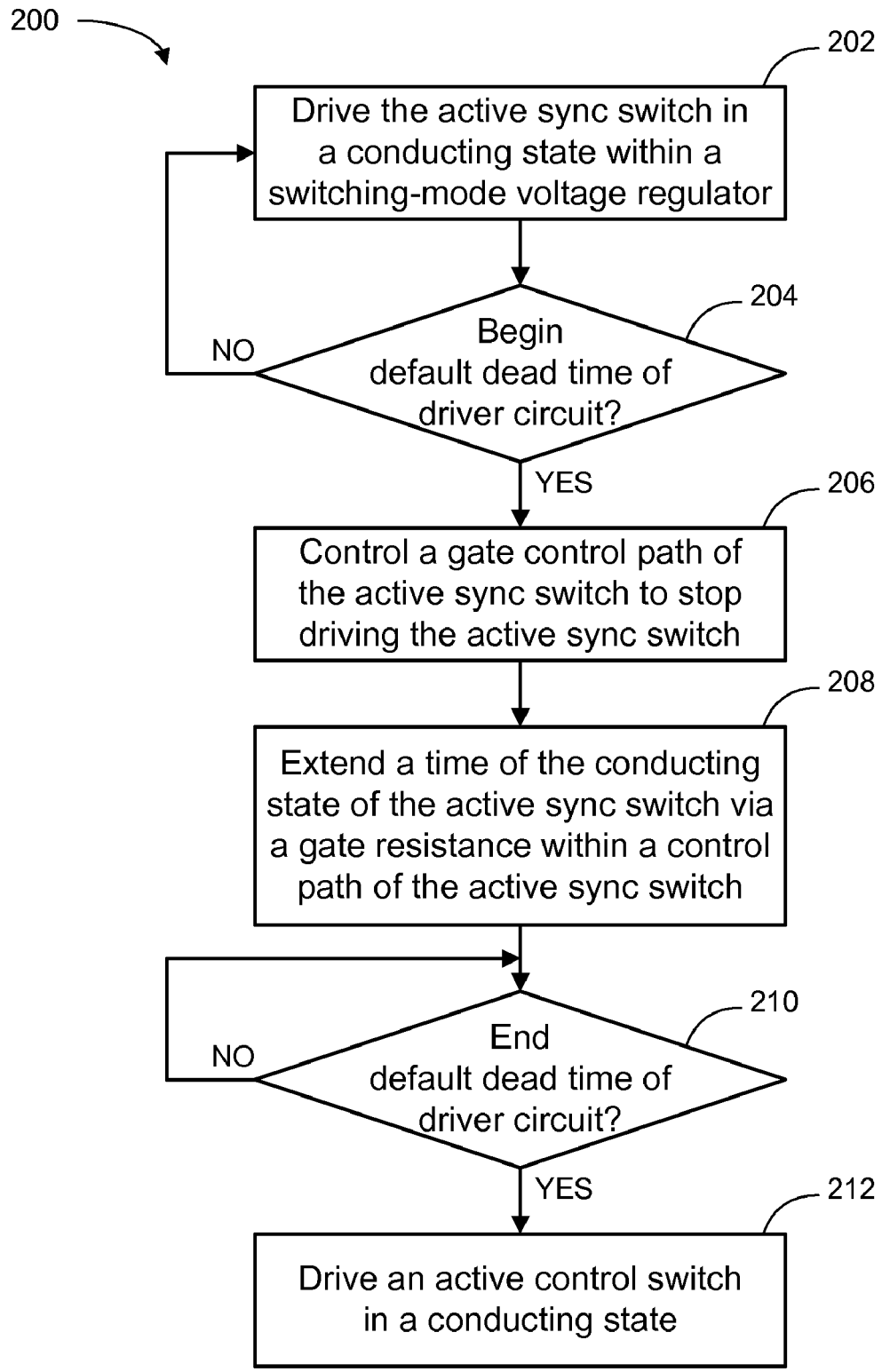
FIG. 6 depicts a flow chart diagram of one embodiment of a method for operating the voltage regulator of FIG. 2 from switching off the sync switch to switching on the control switch.

FIG. 6 depicts a flow chart diagram of one embodiment of a method 200 for operating the voltage regulator 104 of FIG. 2. Specifically, the method 200 illustrates operations that may occur between switching off the sync switch 116 and switching on the control switch 112. Although the method 200 is described in conjunction with the voltage regulator 104 of FIG. 2, embodiments of the method 200 may be implemented with other types of voltage regulators.

At block 202, the driver circuit 118 drives the active sync switch 116 in a conducting state. In a specific embodiment, the active sync switch 116 is a MOSFET device. At block 204, driver circuit 118 determines if it is time to begin a default dead time. As explained above, the default dead time of the driver circuit 118 refers to the time in between when the driver circuit 118 stops driving the active sync switch 116 and starts driving the active control switch 112. The driver circuit 118 continues to drive the active sync switch 116 until it is time to begin the default dead period. When it is time to begin the default dead period, at block 206 the driver circuit 118 controls a gate control path of the active sync switch 116 to stop driving the active sync switch 116.

However, despite the default operation of the driver circuit 116, at block 208 the active sync switch 116 continues in the conducting state due to the presence of a gate resistance within the control path of the active sync switch 116. The gate resistance has a resistance value that is tuned for the combined operating parameters of the active sync switch 116 and the driver circuit 118. As described herein, various embodiments of the gate resistor 122 may be implemented to provide the tuned gate resistance. In some embodiments, the gate resistor 122 is tuned to extend the conducting period of the active sync switch 116 throughout substantially all of the default dead time of the driver circuit 118. Other embodiments of the gate resistor 122 are tuned to extend the conducting period of the active sync switch 116 for a shorter period of time during the default dead time of the driver circuit 118. In either case, the gate resistor 122 facilitates an effective dead time that is shorter than the default dead time of the driver circuit 118.

At block 210, the driver circuit 118 determines if it is time to end the default dead time. In one embodiment, the driver circuit 118 determines when to begin and end the default dead time by using a counter (not shown) or other conventional timing mechanism. When the driver circuit 118 determines it is time to end the default dead time, then at block 212 the driver circuit 118 drives the active control switch 112 in a conducting state. In a specific embodiment, the active control switch 112 is a MOSFET device. The depicted method 200 then ends.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A voltage regulator comprising:
an active control switch coupled between an input voltage line and an input of an energy storage device;
an active sync switch coupled to the input of the energy storage device;
a driver circuit coupled to the control and sync switches, the driver circuit to alternately drive each of the control and sync switches into a conducting state to produce a regulated voltage at an output of the energy storage device; and
a gate resistor coupled in series within a control path of the sync switch, wherein the gate resistor has a resistance value that is tuned to reduce an anticipated dead time between a turn-off time of the sync switch and a turn-on time of the control switch.

2. The voltage regulator of claim 1, wherein the resistance value of the gate resistor is further tuned to reduce an anticipated voltage spike event during a turn-on time of the control switch.

3. The voltage regulator of claim 1, wherein the control and sync switches comprise metal-oxide semiconductor field effect transistor (MOSFET) switches.

4. The voltage regulator of claim 3, wherein the resistance value of the gate resistor is further tuned to delay the turn-off time and extend a conduction time of the sync MOSFET switch.

5. The voltage regulator of claim 4, wherein the anticipated dead time between the turn-off time of the sync switch and the turn-on time of the active switch comprises a default dead time of the driver circuit, and the resistance value of the gate resistor is further tuned to implement an effective dead time that is less than the default dead time of the driver circuit.

6. The voltage regulator of claim 3, wherein the resistance value of the gate resistor is further tuned to reduce a time during which current flows through a body diode of the sync MOSFET switch.

7. The voltage regulator of claim 1, wherein the gate resistor is located in a control line between an output of the driver circuit and a gate input of the sync switch.

8. The voltage regulator of claim 1, wherein the driver circuit comprises an integrated circuit, and the gate resistor is located within the integrated circuit.

9. The voltage regulator of claim 8, wherein the gate resistor is implemented within the driver circuit as an increased output impedance in the control path of the sync switch.

10. The voltage regulator of claim 9, wherein the output impedance in the control path of the sync switch is variable, and the driver circuit is configured to dynamically change the output impedance for different operating modes.

11. The voltage regulator of claim 1, wherein the sync switch comprises a MOSFET device with a gate, and the gate resistor is integrated within the MOSFET device and coupled in series with the gate.

12. The voltage regulator of claim 11, wherein the gate resistor is implemented within the MOSFET device as an increased internal gate resistance in the control path of the sync switch.

13. A method for operating a voltage regulator, the method comprising:
- driving an active sync switch in a conducting state within a switching-mode voltage regulator;
- controlling a gate control path of the active sync switch to stop driving the active sync switch at a beginning of a default dead time of a driver circuit coupled to the control path of the active sync switch;
- extending a time of the conducting state of the active sync switch during the default dead time of the driver circuit via a gate resistance within the control path of the active sync switch, wherein the gate resistance has a resistance value tuned for the combined operating parameters of the active sync switch and the driver circuit; and
- driving an active control switch in a conducting state at an end of the default dead time of the driver circuit.

14. The method of claim 13, wherein the resistance value of the gate resistance is further tuned to reduce an anticipated voltage spike event during a turn-on time of the control switch.

15. The method of claim 13, wherein the gate resistance is implemented in a discrete gate resistor between a sync switch driver output of the driver circuit and a gate of the active sync switch.

16. The method of claim 13, wherein the gate resistance is implemented within an output impedance of a sync switch driver output of the driver circuit, wherein the sync switch driver output of the driver circuit is coupled to a gate of the active sync switch.

17. The method of claim 13, wherein the gate resistance is implemented within an internal gate resistance of the active sync switch, wherein the active sync switch comprises a sync MOSFET switch.

18. A sync MOSFET switch for a voltage regulator, the sync MOSFET switch comprising:
- a source node coupled to reference potential;
- a drain node coupled to a source node of a corresponding control MOSFET switch and also coupled to an input of an energy storage device, wherein the control and sync MOSFET switches are configured to produce a regulated voltage at an output of the energy storage device; and
- a gate node coupled to a gate driver integrated circuit (IC) via a gate control path, wherein the gate control path comprises a gate resistance that is tuned to reduce:
  - an anticipated dead time between a turn-off time of the sync MOSFET switch and a turn-on time of the control MOSFET switch; and
  - an anticipated voltage spike event during a turn-on time of the control MOSFET switch.

19. The sync MOSFET switch of claim 18, wherein the tuned gate resistance is at least partially integrated within an internal gate resistance of the gate node of the sync MOSFET switch.

20. The sync MOSFET switch of claim 18, wherein the gate node is coupled to a discrete gate resistor having the tuned gate resistance, wherein the discrete gate resistor is coupled within the gate control path.

* * * * *